United States Patent
Morovic et al.

(10) Patent No.: US 9,313,360 B2
(45) Date of Patent: Apr. 12, 2016

(54) ENCODING DATA IN AN IMAGE

(71) Applicant: HEWLETT-PACKARD DEVELOPMENT COMPANY, L.P., Houston, TX (US)

(72) Inventors: Peter Morovic, Barcelona (ES); Jan Morovic, Colchester (GB); Peter J. Klammer, Corvallis, OR (US); James William Stasiak, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/446,801

(22) Filed: Jul. 30, 2014

(65) Prior Publication Data
US 2016/0037017 A1    Feb. 4, 2016

(51) Int. Cl.
| H04N 1/00 | (2006.01) |
|---|---|
| H04N 1/32 | (2006.01) |
| G06T 5/00 | (2006.01) |
| H04N 1/56 | (2006.01) |
| G06T 1/00 | (2006.01) |

(52) U.S. Cl.
CPC .......... *H04N 1/32309* (2013.01); *G06T 1/0028* (2013.01); *G06T 5/009* (2013.01); *H04N 1/56* (2013.01); *G06T 2207/10024* (2013.01); *G06T 2207/20008* (2013.01); *H04N 2201/327* (2013.01)

(58) Field of Classification Search
None
See application file for complete search history.

(56) References Cited

U.S. PATENT DOCUMENTS

| 3,963,953 | A * | 6/1976 | Thornton, Jr. ................ 313/487 |
| 6,325,420 | B1 | 12/2001 | Zhang et al. |
| 7,062,087 | B1 | 6/2006 | Varga |
| 7,922,209 | B1 * | 4/2011 | Beretta ............................ 283/91 |
| 8,045,755 | B2 * | 10/2011 | Vigouroux ............ G06T 1/0028 345/589 |
| 8,213,055 | B2 * | 7/2012 | Morovic et al. ............... 358/3.06 |
| 8,451,501 | B2 | 5/2013 | Xu et al. |
| 8,699,081 | B2 | 4/2014 | Rijavec |
| 8,705,140 | B2 | 4/2014 | Li et al. |
| 2003/0072037 | A1 * | 4/2003 | Hamilton ....................... 358/3.28 |
| 2006/0193522 | A1 | 8/2006 | Sonoda et al. |
| 2008/0100856 | A1 | 5/2008 | Lee et al. |
| 2010/0060943 | A1 | 3/2010 | Monga et al. |
| 2011/0200262 | A1 | 8/2011 | Canel-Katz et al. |
| 2013/0019767 | A1 | 1/2013 | Sanger |
| 2013/0329006 | A1 | 12/2013 | Boles et al. |
| 2014/0052285 | A1 | 2/2014 | Butcher et al. |
| 2014/0326864 | A1 | 11/2014 | Foyle |

FOREIGN PATENT DOCUMENTS

WO    WO-2013113372    8/2013

OTHER PUBLICATIONS

Ping Wah Wong and Nasir D. Memon, Image Processing for Halftones—Focusing on inverse halftoning, compression, and watermarking, IEEE Signal Processing Magazine. Jul. 2003. pp. 59-70.

Bergman, Lars "Using multicoloured halftone screens for offset print quality monitoring," Linköping Studies in Science and Technology Licentiate Thesis No. 1147 (Jan. 2005). 118 pages.

PCT International Search Report and Written Opinion, Nov. 6, 2015, PCT Application No. PCT/US2015/040760, Korean Intellectual Property Office, 10 pages.

* cited by examiner

*Primary Examiner* — Paul F Payer
(74) *Attorney, Agent, or Firm* — HP Inc. Patent Department

(57) ABSTRACT

Certain methods and systems are described for encoding data in an image. According to an example, a set of metamers under a first set of conditions may be determined that vary under a second set of conditions. These may be used to generate a set of color mappings for a sampled color value, each color mapping being used for a different data value in the data. As such the data values may be detectable when the image is observed under the second set of conditions but not detectable when the image is observed under the first set of conditions.

11 Claims, 4 Drawing Sheets

ENCODING DATA IN AN IMAGE

BACKGROUND

Data hiding is a technique for embedding information into digital content without causing perceptional degradation. A special case of data hiding is steganography, which is the science and art of secret communication. In steganography, the presence of a hidden message typically needs to be concealed. This may be achieved using a stegatone. A stegatone is a data-bearing steganographic halftone, wherein data is embedded in a halftone image by shifting certain output pixel values, e.g. from 0 to 1. Another case of data hiding is watermarking, where it may be desired to determine the authenticity of digital content. In this case, the presence of a covert watermark may indicate authenticity, while the absence of a watermark may indicate a forgery. When watermarking a document there may be a challenge of avoiding an active adversary that would attempt to remove, invalidate or forge watermarks in digital content. Shifting pixel values of an output halftone may also be used for fragile watermarking. For example, portions of digital content may be modified without causing perceptional degradation such that a proportion of white (e.g. 0 value) or black (e.g. 1 value) in a particular portion is over a predefined threshold.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
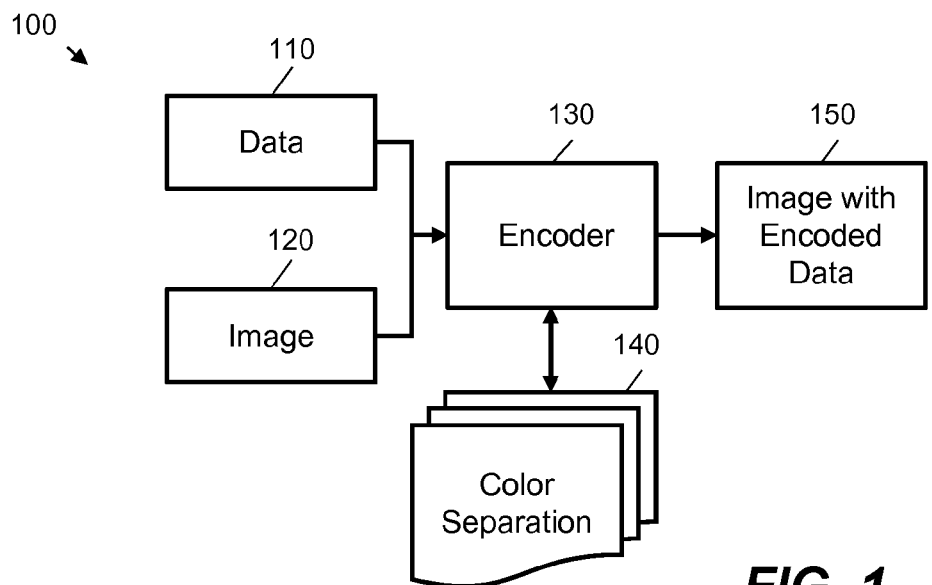
FIG. 1 is a schematic illustration of a system for encoding data in an image according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so typically a color model is used to represent a color at a lower dimensionality. For example, certain color models make use of the fact that color may be seen as a subjective phenomenon. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*-CIELAB or 'LAB') color space, wherein three variables represent lightness ('L') and opposing color dimensions ('a' and 'b'). Certain color spaces, such as RGB and CMYK may be said to be device-dependent, e.g. an output color with a common RGB or CMYK value may have a different perceived color when using different imaging systems.

When working with color spaces, the term "gamut" refers to a multi-dimensional volume in a color space that represents color values that may be output by a given imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

Certain examples described herein allow data to be embedded in an image. These examples use sets of metamers to determine an appropriate color mapping for one or more portions of the image. The metamers may represent different color values in an output color space that map onto a common color value in an input color space under a predefined set of conditions. In certain cases, the metamers may present a color difference under a different predefined set of conditions. The extent of a color difference for each metamer may be used to encode N-ary data in the image, e.g. the encoding of N data values where N>=2. In certain examples, ink additives may be used to extend a color gamut under different conditions. This may allow the encoding of continuous tone data.

FIG. 1 is a schematic illustration showing an encoder system 100 according to an example. This encoder system 100 may be used to encode data 110 in an image 120. The encoder system 100 comprises an encoder 130 that is arranged to receive the data to be encoded 110 and the image 120. The encoder 130 is arranged to access one or more color separations 140. Each color separation 140 provides a mapping from at least one color value in a first color space to at least one color value in a second color space. Typically, a color separation maps a plurality of color values, e.g. a first gamut to a second gamut. In one case, a color separation may provide a one-to-one mapping of color values, in which case there may be a plurality of color separations each providing respective color mappings. In another case, a color separation may provide a one-to-many color mapping, in which case only a single color separation may be provided. The encoder 130 is arranged to receive color data for the image 120 in the first color space and use a color separation 140 to provide output color data for the image 120. For at least a portion of the image 120, the data 110 may be used to select a particular color separation from a plurality of color separations, or it may be used to select a particular output of a single color separation with a one-to-many output. In any case, a particular color mapping, as implemented by a color separation, is selected based on the data 110. For example, for at least a portion of the image 120, a particular data value from the data may be used to select a particular color separation that is used to encode that data value in the portion of the image. The result is an image with encoded data 150. The image with encoded data 150 may be output using an imaging device, for example printed on a substrate, e.g. in two or three dimensions, or displayed on a display device.

For a particular color value in the first color space, the plurality of color mappings implemented by the one or more color separations each output a different color value in the second color space. As such, the plurality of color mappings may be said to map to a set of metamers under a first set of conditions. For example, when a plurality of color separations are used each color separation may output a different metamer. This first set of conditions may be a particular set of illumination conditions, e.g. illumination with a standard illuminant such as D50 or illumination with one or more wavelength ranges, and/or a particular observer model, such as that of the human visual system described by the CIE XYZ curves. For example, under the first set of conditions, an output image may be generated using different color values in the second color space, e.g. printed or displayed, but when measured the output colors may map back to the common color value in the first color space (or at least reside within a given tolerance of the common color value).

In one case, the first color space may be an input color space of the image 120. For example, it may comprise an RGB (or RGB-derived) color space (such as sRGB or Adobe RGB etc.). In another case, the first color space may be an intermediate color space, e.g. input color data for the image 120 may be mapped to the intermediate color space before being mapped to the second color space. The intermediate color space may be a device-independent color space. For example, in this case the first color space may be an XYZ (or XYZ-derived) color space. In this latter case, the image 120 may comprise color data in an RGB space that is mapped to an XYZ color space in a preprocessing step.

In one case, the second color space may use ink overprint statistics to represent a color. For example, a color value in the second color space may comprise an ink-primary-overprint area-coverage vector such as a Neugebauer Primary Area Coverage (NPac) vector as described below with regard to FIG. 3. In this case, the ink overprint statistics may represent a color halftone that is printable on a M-level printing device. This may be compared to a comparative case wherein ink vectors are used as an output color space. In this comparative case, a color value, e.g. that represents a pixel or other image portion, may comprise a continuous tone value, such as a percentage of each of the available inks in a printing device (e.g. in a CMYK system-[C=20%, M=30%, Y=0%, K=0%]). In the comparative case, this continuous tone value may then be input into a separate halftoning system that applies a particular spatial pattern (a halftone 'screen') and provides a discrete (e.g. binary in a 2-level printing device) ink-deposition control output. Ink overprint statistics, on the other hand, provide an output that is representative of different ink over-print coverages (e.g. C without Y or M, or MY—i.e. yellow overprinted with magenta) over a unit area. Using ink overprint statistics provides an output color space of higher dimensionality than the comparative case, which enables a color value in the first color space to be represented by many different ink-primary area-coverage vectors.

In the example of FIG. 1, the color mappings provided by the one or more color separations 140 are configured such that a color of at least a portion of the output image 150 that encodes at least one data value has a first appearance under the first set of conditions but a different appearance under a second set of conditions. In other words, in an objective sense, a measured color for the portion has a color difference between measured color values under different sets of conditions. In one case, a non-zero data value may be encoded using an output color value that results in an image portion having a color difference above a threshold when illuminated with two different illumination sources, e.g. D50 and ultraviolet light. This threshold may indicate the ability for the color difference to be distinguished, either perceptually by a human being or electronically by a detection apparatus. In this case, a zero data value and/or a portion of the image without encoded data may exhibit a color difference below a threshold, e.g. may indicate that the color appears the same under the two different illumination sources. This is described below in more detail with reference to the decoder of FIG. 2. In another case, the first set of conditions may comprise a capture of the image by the human visual system (e.g. observance by a human being) or an image capture system with distinguishing characteristics indicative of the human visual system. In this case, the second set of conditions may comprise a capture of the image by a camera, e.g. a specific capture device with a known set of capture sensitivities. Hence, data 110 may be imperceptible by a human being under normal conditions but may be perceptible when measuring color values from an image captured by a smartphone camera.

Figure 2:
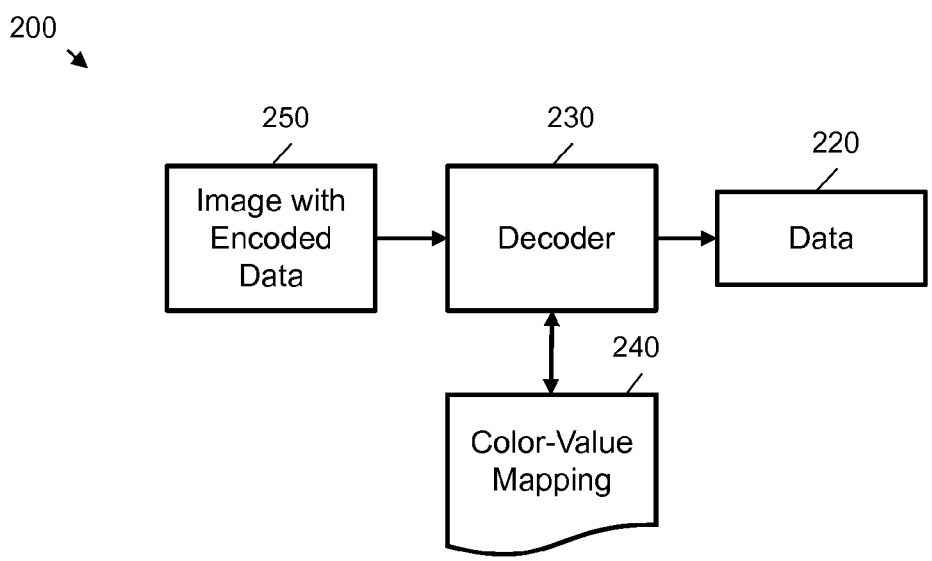
FIG. 2 is a schematic illustration of a system for decoding data embedded in an image according to an example.

FIG. 2 is a schematic illustration of a decoder system 200 according to an example. The decoder system 200 is arranged to decode data that is embedded in an image, e.g. by the encoder system 100 of FIG. 1. The decoder system 200 comprises a decoder 230 that is arranged to receive an image with encoded data 250. The image with encoded data 250 may be captured by an imaging device, such as a charge-coupled device (CCD) array. The image 250 may be captured from a printed output, e.g. a printed version of image 150, or a displayed output, e.g. a version displayed on a light-emitting diode (LED) display. The imaging device may form part of a portable computing device such as a smartphone. The image with encoded data 250 is obtained at least under the second set of conditions. For example, the decoder 230 may be arranged to receive an image captured while a printed output is illuminated by the second illuminant discussed above. In certain cases, a version of the image with encoded data 250 may also be captured under the first set of conditions, e.g. for use in comparisons with the image obtained under the second set of conditions.

The decoder 230 is arranged to measure a metric of at least a portion of the image 250. This metric may be associated with color and/or spectral properties of a measured portion of the image 250. For example, the decoder 230 may be arranged to determine RGB and/or XYZ pixel values for an area of a substrate comprising image 150. In this case, the decoder 230 is then arranged to use a color-metric-to-data-value mapping 240 to determine data values of any data embedded in the image 250. In another case, the metric may relate to infra-red wavelengths, in which case it would be a metric associated with a color outside of the visible spectrum. In a case where binary data is encoded in the image 250 this may involve comparing a version of the image 250 captured under the first set of conditions with a version of the image 250 captured under the second set of conditions; in this case, a color difference above a threshold may indicate a data value of 1, while a color difference under the threshold may indicate a data value of 0. In a case where N-ary data is encoded, a magnitude of a color difference may be quantized according to a predetermined quantization scheme, wherein each range in the quantization scheme is mapped to a different data value. In a case where only a version of the image 250 under the second set of conditions is captured, a predefined 'key' region may be included in the image 150. In this region, a known data value, e.g. 0, may embedded and used as a comparison value for a known block of solid color. In another case, particular color value ranges under the second set of conditions may be mapped directly to data values, e.g. via a look-up table. In any case, the decoder 230 is able to extract the data values of the encoded data and output these as decoded data 220. Although the color-metric-to-data-value mapping 240 is shown as a discrete entity in FIG. 2, in certain implementations this mapping may be implemented by pre-configured routines, e.g. similar to those described above, that are run by the decoded rather than any explicit value look-up.

In one case, instead of detector 230, the human visual system may be used, e.g. data 110 may be imperceptible when visually inspected under a first set of conditions but perceptible when inspected under a second set of conditions. For example, a second image may be perceived in an area of color under ultra-violet light. In another case, image 150 may comprise an existing data-encoding image, for example a known stegatone or QR code, that is enhanced by the N-ary encoding described in the examples. In this case, the examples described herein may extend a known binary stegatone or QR code to an N-ary case with multiple color encodings for multiple data values. In this case, the detector 230 may comprise an adapted version of a known detection mechanism, e.g. a detector for known stegatone or QR codes, wherein the adaptation allows detection of color difference, e.g. compared to a binary case.

In one implementation the second color space may comprise dimensions for one of a plurality of NPac values in an NPac vector. An NPac space provides a large number of metamers that enable information hiding under different conditions. An NPac represents a distribution of one or more Neugebauer Primaries (NPs) over a unit area. An NP is a combination of one or more printing fluids (e.g. inks) in an imaging system, wherein the total set of NPs represent the total number of printing fluids combinations that can be output by the imaging system. An NP may thus represent one ink overprinted by one or more other inks, e.g. in an addressable area on a printed output. For example, in a binary (bi-level) printer, an NP is one of $2^k$ combinations of k inks within the printing system. For example, if a printing device uses CMY inks there can be eight NPs, these NPs relate to the following: C, M, Y, C+M, C+Y, M+Y, C+M+Y, and W (white or blank indicating an absence of ink). With four inks there may be 16 NPs on a binary system. Other examples may also incorporate multi-level printers, e.g. where print heads are able to deposit M drop levels (e.g. M=3 for a system capable of 0, 1, 2 drop levels), in this case an NP may comprise one of $M^k$ combinations of k inks within the printing system. Although certain printing device examples are described with reference to one or more colorant levels, it should be understood that any color mappings may be extended to other printing fluids such as glosses and/or varnishes that may be deposited in a printing system and that may alter a perceived output color; these may be modelled as NPs. In certain cases, one or more printing fluids may further contain additives that modify the spectra of a printed output. For example, an ink may be modified with photoluminescent, quantum-dot or nanoparticle additives that modify a light spectrum as measured from the output. For example, these additives may emit a narrow-band of specific wavelengths anywhere in the visible range of wavelengths when illuminated by electromagnetic radiation comprising particular wavelengths or wavelength ranges, including generic, common light sources.

Figure 3:
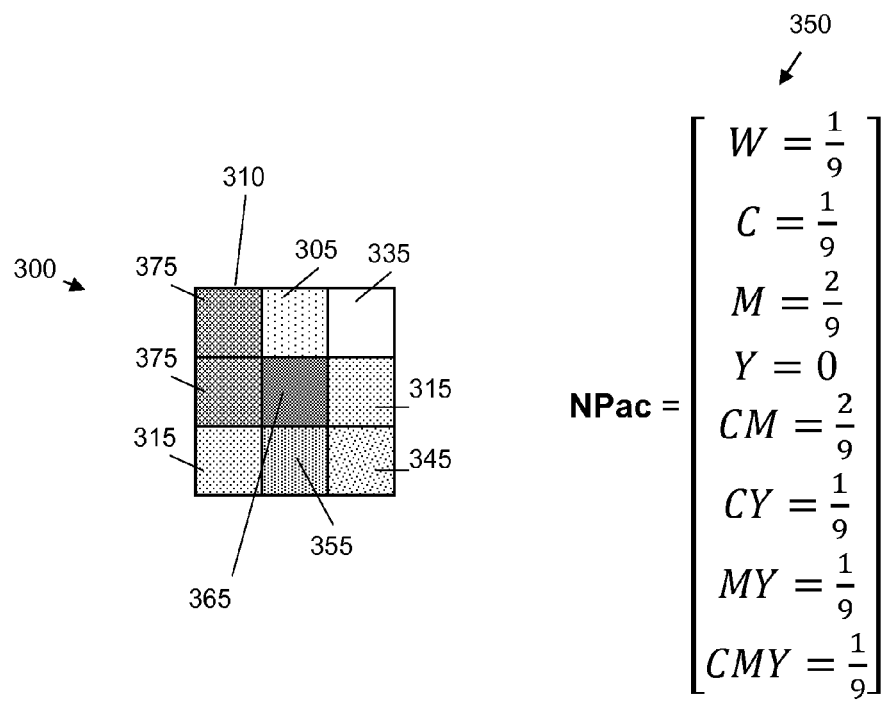
FIG. 3 is a schematic illustration of an ink-primary area-coverage vector according to an example.

FIG. 3 shows an example NPac vector 350 for use in a CMY imaging system. This example shows a three-by-three pixel area 310 of a print output where all pixels have the same NPac vector: vector 350. The NPac vector 350 defines the probability distributions for each NP for each pixel, e.g. a likelihood that NPx is to be placed at the pixel location. Hence, in the example print output there is one pixel of White (W) (335); one pixel of Cyan (C) (305); two pixels of Magenta (M) (315); no pixels of Yellow (Y); two pixels of Cyan+Magenta (CM) (375); one pixel of Cyan+Yellow (CY) (345); one pixel of Magenta+Yellow (MY) (355); and one pixel of Cyan+Magenta+Yellow (CMY) (365). Generally, the print output of a given area is generated such that the probability distributions set by the NPac vectors of each pixel are fulfilled. As such, an NPac vector is representative of the ink overprint statistics of a given area. Any subsequent processing effects the probability distributions, e.g. in any halftoning process. Although CMY system is used for ease of explanation, other imaging systems may be used.

A printing system that uses NPacs may be referred to as a Halftone Area Neugebauer Separation (HANS) system. In this system, color mapping outputs an NPac image from an input image, followed by a halftoning step that selects NPs (device states, ink-overprints) from NPacs at every pixel. In certain cases, this system may be modified to implement the examples described herein. The relative high dimensionality of an NPac representation gives access to a set of metamers for a particular color value in a tristimulus color space (e.g. XYZ or LAB). For each color value in the tristimulus color space there will thus be a choice as to which metamer from the set of metamers, e.g. which NPac vector, is chosen to reproduce the color value. The size of the set of metamers may depend on the input color value. For example, in a simple 3-ink printing system (CMY) as represented in LAB space, a degree of redundancy, e.g. as represented by a cardinality of a metamer set, may be largest along a 0-axis in the a* and/or b* dimensions, i.e. along the neutral axis, especially for mid-levels.

In certain implementations, an accessible color gamut may be modified by adding one or more additives to one of more printing fluids. For example, a Yellow (Y) ink may be modified with photoluminescent ink additives while keeping CM or CMK inks unchanged. These additives may lead to printing fluids with different spectral and colorimetric properties under different set of conditions. For example, a different color gamut may be available under two different illumination conditions, e.g. D50 and a fluorescent flash. In other cases no additives may need to be added, the nature of the metamers may result in different color values under different illuminations. For example, certain metamers may use different amounts of a given printing fluid, e.g. have different levels of K-ink use or Y-ink use. Due to these different printing-fluid-use levels, an NPac may be a metamer to another NPac under a standard illuminant but under a non-standard illuminant (e.g. of a particular color or strength) a color difference based on the differing printing-fluid-use may become detectable. This color difference may then be used to encode information, for example as compared to another metameric NPac with more evenly distributed printing-fluid-use that may not vary under different illuminants.

In any case, in these implementations, a metamer set, e.g. representing NPac vectors that perceptually match in color under nominal conditions, may be evaluated and one metamer may be selected that minimizes a metric under nominal conditions but that is within a different metric range under different conditions. Where detectable differences exist under two sets of conditions for one set of metamers, yet do not exist for a second set of metamers, this can be used to encode information in an image. For example, this may be used to encode information through, amongst others, one or more of stegatones, barcodes, QR codes, text and imagery.

Figure 4:
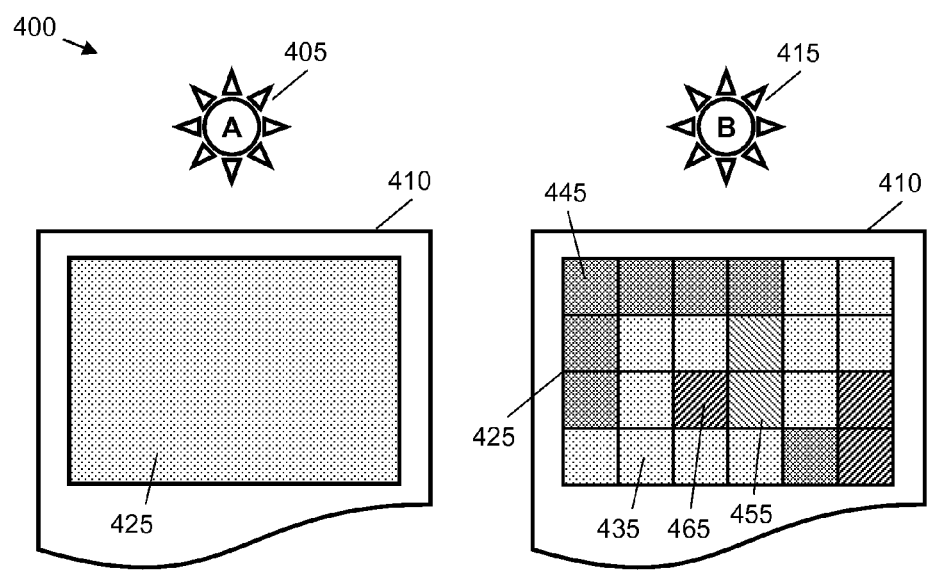
FIG. 4 is a schematic illustration of an output image under two different conditions according to an example.

FIG. 4 is a schematic diagram showing an example 400 of embedded information. FIG. 4 shows two versions of a printed output 410 under different illumination conditions: a first illuminant 'A' 405 and a second illuminant 'B' 415. Even though a printed output 410 is shown in this example, in other implementations an output on a display device may be used. Under the first illuminant 405 a portion of a printed image 425 appears to have a uniform color, e.g. when viewed by a human observer. Objectively this may be indicated by a measured color difference between adjacent pixels (e.g. of a scanned version) that is below a threshold, wherein this threshold may be indicative of a perception level or a machine tolerance indicating similarity. However, under the second illuminant 415 the portion 425 has a number of areas of different colors. For ease of explanation each of these areas will be referred to as a 'pixel', however these need not represent the resolution of either an image output or acquisition device, e.g. may be areas covered by multiple device pixels.

In FIG. 4 there are four rows of six pixels. The upper left hand corner will be referred to as pixel (1,1) and the lower right hand corner will be referred to as pixel (6,4), with the other pixels having values in the range (1-6, 1-4). As can be seen, there are a first set of pixels 435 that do not change in color under the second illuminant 415: (1,4), (2,2-4), (3,4), (4,4), (5,1-3) and (6,1-2). These pixels may encode a data value of 0 (alternatively, they may represent image areas that do not contain encoded information). There are then a second set of pixels 445 that change in color under the second illuminant 415: (1,1-3), (2,1), (3,1), (4,1) and (5,4). These pixels may encode a data value of 1. There are a third set of pixels 455 that also change in color under the second illuminant 415: (4,2-3). These change in color in a different manner to the second set of pixels 445 and may encode a data value of 2. For example, they may have a different color metric such as lightness and/or hue. Finally, in FIG. 4, there are a fourth set of pixels 465 that again change in color under the second illuminant 415: (3,3) and (6,3-4). These change in color in a different manner to the second set of pixels 445 and the third set of pixels 455. Again the different manner may be represented by a different measured color metric value. As described above, a color metric need not be limited to properties of colors in the visible spectrum; for example, it may also relate to measured infra-red and/or ultra-violet properties. The fourth set of pixels 465 may encode a data value of 3.

FIG. 4 thus demonstrates a simple example of encoding information in an image. In this case, data is encoded in a 4-ary scheme: four different data values 0 to 3 may be encoded. The image portion 425 may, for example, hide a QR code under normal illumination that is only visible under a custom illumination (e.g. a flash of a portable computing device such as a smartphone). It should be noted that the physical composition of the printed output 410 does not change between the two sets of conditions; rather the difference arises due to the fact that a detectable appearance of color is dependent on the conditions under which an image is observed or captured, such as illumination. In one case, pixels 445 to 465 may be printed with inks that contain additives that alter a reflectance and/or emission spectrum under different conditions. While FIG. 4 shows an N-ary case, a binary case may be implemented in a similar way, e.g. by configuring pixels 445 to 465 to have a common visual appearance under the second illuminant 415. Implementations of the example may also vary in color as well as lightness under the second illuminant, e.g. due to differing ink use an area that appears green under the first illuminant 405 may appear yellow or blue under the second illuminant 415. The differences may also be encoded and become measurable outside of the visible range whereby detection in that case is only possible by objective means (e.g. by a camera, a scanner and/or one or more sensors) with sensitivity in that range—e.g. under ultraviolet or infra-red illumination. Different color properties, such as different perceived and/or measured intensity, hue and/or lightness levels may enable data in the form of a continuous tone image to be embedded in an image portion that appears, or is detected to be, uniform under the first illuminant 405. As such complex N-ary watermarks and/or stegatones may be implemented.

A number of example methods will now be described with reference to FIGS. 5 to 7. These methods may be used to configure and/or operate one or more of the encoder 130 of FIG. 1 and the decoder 230 of FIG. 2. These methods may be used to encode and/or decode continuous-tone-like information in printed content based on the principles of metamerism. In certain cases, a HANS color pipeline may be used to implement the methods. In certain cases, custom modified inks with additives may be used. These additives may be configured to react under custom illumination such as visible light or ultraviolet or infra-red light. By using at least one of these three elements visual or machine-readable information can be encoded in an image and reliably detected.

Figure 5:
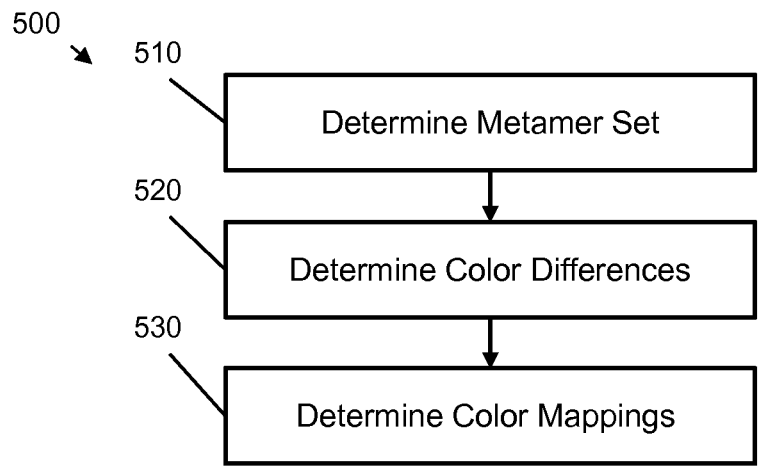
FIG. 5 is a flowchart showing a method of configuring an encoding scheme according to an example.

FIG. 5 is a flowchart showing a method 500 of determining a set of color mappings for encoding data values in an image. At block 510, a color is sampled in a first color space and a set of (e.g. two or more) metamers for the sampled color are determined. Each metamer in the set of metamers has a different representation in a second color space that is used to output the image. The set of metamers are evaluated under a first set of conditions, e.g. the first color space may indicate color values associated with a first illuminant or set of illuminants, such as standard illuminant D50 or "daylight" illuminants. As such, the two or more output colors in the second color space are metamers in that they may both be used to output the sampled color value under the first set of conditions.

At block 520, a range of color differences for the set of metamers is determined. These color differences are evaluated for the set of metamers under a second set of conditions, e.g. under a second, custom illuminant or set of illuminants, such as a representative set of smartphone flash spectra. For example, data indicating the spectral and/or colorimetric properties of the metamers under the second set of conditions may be used to determine a color value for each metamer in the first color space under these conditions. While under the first set of conditions metamers are sought such that their color differences are minimal (e.g. 0 for strict metamers or small for paramers—non-strict metamers), this metamer set constitutes the candidate representations of the single color.

Conversely, under the second set of conditions the largest color differences among this set (metameric under the first set of conditions) are sought and quantized. In one case, metamers may be selected that have color differences in the second color space above a given threshold. For example, metamers may be selected with color differences that indicate the metamers may be distinguished into N categories for an N-ary encoding scheme. As such, the criteria for the N categories may depend on the detection apparatus. For an observer, the color differences may be evaluated such that the observer is able to perceive N different categories of color under the second set of conditions. In another case, a color difference may be calculated between a color value of the sampled color in the first color space under the first set of conditions and a color value of a selected metamer in the first color space under the second set of conditions. The color difference may be calculated using one or more of the CIE 'delta E' color difference equations (e.g. CIE76, CIE94 and CIEDE2000). In other examples, a color metric other than color difference may be used, for example a metric based on measured and/or predicted spectral and/or colorimetric properties and/or any distance, area or volume metric in an appropriate color space. In the present example, the range of color differences may comprise a color difference value for each metamer in the set of metamers.

At block 530, a set of color mappings to the second color space are determined based on the color differences determined at block 520. Each color mapping maps the color value of the sampled color in the first color space under the first set of conditions to a representation in the second color space. In one implementation, this representation may comprise a set of ink overprint statistics such as an NPac vector. The representation comprises a color value for a metamer in the second color space. Each color mapping in the set of color mappings is useable to encode a different data value in the image. For example, a color mapping may be chosen for a '0' data value that maps to a metamer with a color difference below a predetermined threshold indicative of a color 'match'; while a color mapping may be chosen for a '1' data value that maps to a metamer with a color difference above the same, or a different, predetermined threshold indicative of a color 'mismatch'. For an N-ary case, the range of color differences may be quantized to provide N sub-ranges of color differences. In this case, for each sub-range, a color mapping may be selected that outputs a metamer associated with the sub-range. This then provides a plurality of color mappings, wherein each mapping is associated with one of the N data values. The data values are then detectable when the image is viewed and/or captured under the second set of conditions, e.g. when illuminated with a second illuminant.

In one case, the color mappings may output an NPac that is useable by a print device to deposit one or more printing fluids in a unit area of substrate. The print device may comprise one or more printing fluids with one or more additives, such as photoluminescent materials, quantum dots or nanoparticles. Each of these additives may be arranged to reflect and/or emit electromagnetic radiation in a specified wavelength range. In this case, an available ink-set may be determined by characterizing the spectral and/or colorimetric properties of the printing fluids under both sets of conditions, e.g. a nominal, standard illumination such as under D50 illuminant, and a custom illuminant under which detection is sought (e.g. a fluorescent flash). These properties may then be used to compute the set of metamers at block 510, e.g. the first color space may comprise a nominal D50 XYZ color space and metamer sets may be computed for a uniformly spread set of points covering the available color gamut. In this case block 520 may then comprise computing the available spread or color/spectral mismatch under the custom illuminant for each metamer set.

The method 500 may be repeated sequentially, or in parallel, for a plurality of sampled colors. This may enable a color separation to be generated that comprises color mappings from a plurality of color values in the first color space. A different color separation may then be generated for each of the N data values in an N-ary encoding scheme, each separation comprising a corresponding set of mappings from the repeated application of block 530. For example, a sequence of N color separations may be computed based on NPac vector values from metamer sets that vary amongst each other under the changed illumination. In one case, there may also be a requirement to vary progressively more than a reference metamer under a change in illumination. In this case a first color separation may be computed that maps to NPac vectors selected based on metamer sets that vary as little as possible under a change in the illumination (e.g. from D50 to a fluorescent flash), wherein this first color separation is used as a reference or null case for comparison with the N color separations discussed above. In this case, the result is a sequence of N+1 color separations whereby the first one is used for general content printing, while the remaining N are used for the N-ary data encoding depending on the input data values to be encoded. In any case, each color separation may be a RGB or XYZ to NPac look-up table. Alternatively, in certain cases, the first color separation may be used for both general content printing and to encode one of the N data values (e.g. a 0 value), wherein general content printing refers to areas of a printed output that do not contain embedded content. For example, in an N=1 case there may be two color separations enabling binary encoding.

Any quantization applied at block 520 may also determine the number of data values (e.g. N) that can be encoded. For example, a detection device may have a set distinguishing resolution, e.g. the device may only be able to detect color differences above a given threshold and two measured color values may only be distinguished if they differ from each other by a color difference that is above this threshold. This color difference may be between the two measured color values under the second set of conditions and/or between a measured color value under the first set of conditions and a measured color value under the second set of conditions. The detection device may thus impart one or more constraints on the quantization scheme such as a minimum sub-range width. Given the full range of color differences determined at block 520, this can constraint the number of sub-ranges within the full range and hence the number of levels (e.g. N) that are available. For multidimensional color spaces, quantization may be applied to the multidimensional volume between color values within the space, e.g. between different metamer color values in the first color space under a second set of conditions. The level of quantization may also depend on the variety of metamers within a metamer set, e.g. depending on the detection apparatus a distance in one color dimension may be more reliably detected.

Figure 6:
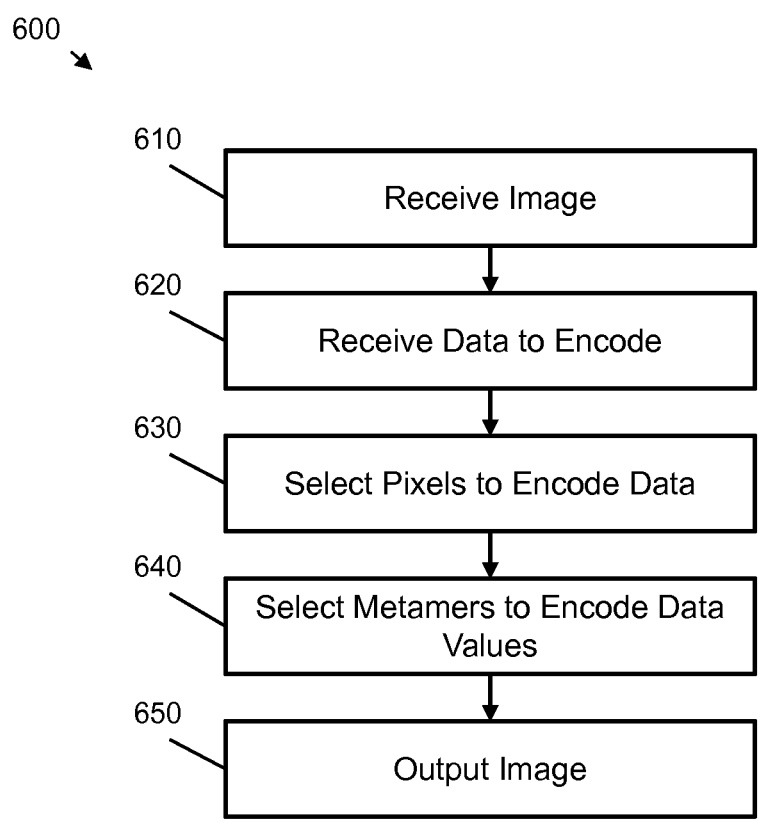
FIG. 6 is a flowchart showing a method of encoding data in an image according to an example.

FIG. 6 is a flowchart showing a method 600 of encoding data in an image according to an example. At block 610 a carrier image is received. This carrier image may be image 120. The carrier image comprises pixels having color values in a first color space. For example, the carrier image may comprise pixels with tristimulus values such as RGB or XYZ. In certain cases, a preprocessing operation may map image data from an input color space to the first color space. For example, a carrier image having RGB pixel values may be mapped to an XYZ color space using a given color profile. At block 620 data to be encoded is received. This may comprise a set of bits or bytes to be encoded. In certain cases it may comprise an existing set of encoded data such as a binary QR code or stegatone. In this latter case, the encoding method may seek to enhance the appearance of the existing data encoding, e.g. make a QR code more detectable, e.g. to a human or machine. In one case the data may be received as, or converted to, a grayscale encoding image. This grayscale encoding image may be of the same size as the carrier image received at block 610 or of a size to match a selected portion of the carrier image. The grayscale encoding image may be arranged such that each pixel of the grayscale encoding image represents a data value from the data, e.g. a data values having one of N levels or values. At block 630, a number of pixels of the carrier image are selected to encode the data. If a grayscale encoding image is used that is the same size as the carrier image, there may be a one-to-one pixel mapping. If the grayscale encoding image is of a different size, then a subset of pixels of the carrier image may be selected and/or the grayscale encoding image may be scaled and/or tiled to match or fill the size of the carrier image. In any case, at this block, each pixel from the carrier image that is selected to encode data is associated with a corresponding data value from the data. For example, if a grayscale encoding image is the same size as the carrier image, each pixel of the carrier image is associated with a corresponding pixel value of the grayscale encoding image, the latter representing one of the data values from the data.

Returning to FIG. 6, at block 640, for each pixel of the carrier image selected to encode the data, a metamer is selected in a second color space based on the data value associated with the pixel. The metamer is selected from a plurality of metamers for a color value of the pixel of the carrier image under a first set of conditions. In this case, each data value has a different associated metamer, e.g. a different color value in the second color space, and each metamer has a different color metric under a second set of conditions. For example, one of N color separations or color mappings as determined in block 530 of FIG. 5 may be selected at this stage depending on the data value, e.g. which one of N levels is represented by the data value.

In one case, if a full color carrier image 'A' and a grayscale encoding image 'B' of the same size are used, then if at pixel location [x, y] B is transparent (or white), color separation 1 is used and if at pixel location [x, y] B has a grayscale value quantized to a level i between [1 to N], color separation i+1 is used instead. Image B therefore acts as an indexing image into the domain of color separations which vary in their behavior under a custom illuminant. In a case with one or more one-to-many color separations, i may alternately or additional represent an index into the output of each one-to-many color separation. In one case, a number of color separations N with varying magnitude of ink-additive contributed spectral responses may depend both on the location in color space where there is variety in color redundancy and the type of mismatch-inducing illumination coupled with the inks additive properties themselves. For example, where there is little redundancy, e.g. either due to the area of color space that has small metamer sets or due to a detection illuminant that causes relatively small variation an encoding scheme with a low number of separations, e.g. a binary encoding scheme, may be used. Where there is sufficient redundancy to have different levels of response under a second custom illuminant different levels ('gray'-scales) in the information/content may be encoded that appear when appropriately illuminated.

In any case, after a set of metamers have been selected to output the pixels of the carrier image an output image encoding the data is generated at block 650. This image may comprise the image 150 in FIG. 1. This block may involve printing the image using the metamer values as input to a print pipeline or print device. Alternatively, it may comprise displaying the image on a display device, wherein the metamer values are used to instruct operation of a display element such as an LED. In a further example, the image may form part of a three-dimensional (3D) output, e.g. be used to select color values of a 3D printing substrate or construction fluid. As such the metamer values that are output by way of the selected color separations or mappings encode the data. The plurality of metamer values may have a set of color metrics that are below a first threshold under a first set of conditions, as such they may be observed and/or detected as comprising a single color under these conditions. However, under a second set of conditions a color difference may be distinguishable.

Figure 7:
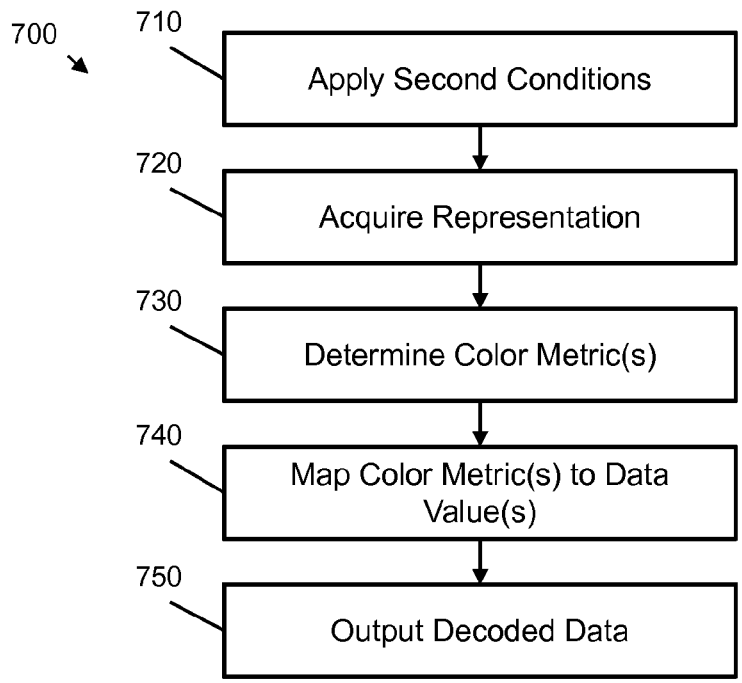
FIG. 7 is a flowchart showing a method of decoding data embedded in an image according to an example.

FIG. 7 is a flowchart showing a method 700 of detecting data that is embedded in an image. The method 700 may be used to decode data encoded by the method 600 of FIG. 6 and may be implemented by the decoder 230 of FIG. 2. At block 710, a second set of conditions are applied to an image with encoded data. This may comprise illuminating a printed or displayed image with a second, custom illuminant. At block 720, a representation of the image is acquired whilst the second set of conditions are applied. This may comprise capturing the image with a camera or CCD array. At block 730, a digital version of the representation is analyzed to determine color metrics for one or more areas of the image. This may comprise determining a color difference or color value for the area. In the former case, the color difference may be determined with respect to a known unencoded image portion or a representation of the image acquired under a first set of conditions, such as a standard illuminant. The capture may also serve simply to enhance a signal (e.g. to increase color differences, without these having to be categorized) and result in a captured image that is better suited for existing detection techniques be they for QR codes or stegatones etc. At block 740, the determined color metrics are mapped to one or more data values. For example, this may comprise applying any quantization scheme used in block 520 of FIG. 5. In one case, a decoder may be supplied with mapping of color values under the second set of conditions to data values. In another case, a data value may be determined by the magnitude of a color difference when compared to an unencoded or 0-value portion of the image. Finally, at block 750 the determined data values are output to reconstruct the data that was encoded in the image. In certain cases, known error correction and/or detection techniques may be used to correct for any error introduced in the output and acquisition of the image with the encoded data.

FIG. 7 shows one particular example. In another case detection may be performed via visual inspection, e.g. a watermark or text may simply "appear" under the second set of conditions.

In one variation of certain examples described herein, "data" to be encoded may not necessarily comprise data to be reconstructed. For example, the data to be encoded may comprise an image that is viewable under the second set of conditions and/or may comprise machine-readable image portions that facilitate image processing. In the latter case, the image may comprise a regular grid with every j th pixel having a different color value in the second color space (e.g. a different metamer). In this case, a grid of pixels may not be visible under normal conditions but may be detectable under a second set of conditions, such as a smartphone flash. If an image is captured under the second set of conditions the encoded data, in the form of a regular grid, may facilitate image registration and detection using image processing algorithms such as statistical matching algorithms.

Certain examples described herein provide a mechanism to encode information in a visual or machine-readable manner. Certain examples described herein use the large metamer space provided by a color processing system that uses ink overprint statistics as an output color space. Certain examples described herein may use an ink-set that is modified to contain ink additives such as photoluminescent components, quantum-dots or nanocrystals in one or all of a set of available inks. These additives provide narrow-band spectral emissions. In certain cases where such inks are used with a color processing system that uses ink overprint statistics, it is possible to encode continuous-tone-like information in an image, such as to implement a watermark, a QR code, stegatones, etc. Certain examples described herein make use of large metamer sets, e.g. color halftone patterns that match in color under nominal conditions, in large parts of the available color gamut independently of the used inks. In this case each metameric pattern may have a different response under a custom illumination, for example due to any additives in one or more inks. Hence there is a choice of metamers for the same color under nominal conditions while having the ability to choose patterns that are different when illuminated by a second illuminant (e.g. a mobile phone camera flash or some other custom illuminant).

In one implementation of block 530, metamer selection may be based on one or more custom criteria. For example, in the case of encoding only binary information where two color separations are computed, one color separation may be selected to minimize at least one color metric, e.g. representative of a minimal ink-additive-effect, and one color separation may be selected to maximize at least one color metric under a custom illumination. This may allow a color 'match' under a first set of conditions, and a color 'mismatch' under a second set of conditions, to be maximized. As a color gamut available with additive-enhanced inks can be modelled as a continuous volume in a color space, an optimal metamer within this gamut may be selected based on the defined criteria. Additionally, quantum-dot components in inks behave additively in terms of their spectral emission with each additional overlay or overprint. Since color processing systems described herein control print via ink overprint statistics, the use of quantum-dot components can be incorporated by re-characterizing ink spectral and/or colorimetric properties to take into account the spectrally-additive emissive effect of overprints of modified inks. This also allows metamers to be selected that have a smooth transition, e.g. over a small number of pixels between output areas with no additive effect and output areas with an additive effect. For examples this may be achieved by blending the color separations and/or metamers.

In certain cases, one chromatic color may be selected to encode information where a level of redundancy is above a set threshold while at the same time being a color wherein the human visual system is relatively insensitive to small deviations in colorimetry.

In one case, the selection of metamers and/or any color mapping may take place in a spectral domain, e.g. wherein colors are characterized by values representative of spectral characteristics such as quantized wavelength ranges. Working in a spectral domain allows for a co-optimization of both the color-match under nominal conditions (e.g. minimizing any small color differences) and the color-mismatch under a secondary illuminant (e.g. maximizing the color differences). It may also allow sequences of illuminants to be selected where a match is wanted and sequences of illuminants to be selected where a mismatch is sought.

In one case, evaluation of one or more color metrics to select a metamer may comprise evaluating a grain metric, e.g. representative of a halftone grain that results from a particular NPac. For example, a metamer may be chosen such that has a larger grain metric representative of a 'grainier' appearance that may act to mask out some color differences between output metamers that for smoother, less grainy colors may be objectionable. In one case, a grain metric may be considered in addition to a color metric. For example, a metamer may be selected from a metamer set such that: 1) it has a color difference above a set threshold under a second illuminant, e.g. as compared with a previously selected metamer for another data value or a default case; and 2) has a predetermined level of grain to mask out the transition. For example, a level of grain may be selected that is the same as the level of grain selected for other metamers associated with other data values.

Certain examples herein provide for the encoding of N-ary security features of any kind for visual or machine-vision based detection or validation. For example, these security features may be, amongst others, images, codes and signatures. They may work in concert with other security encoding mechanisms that have the ability to represent N-ary information such as color/grayscale QR-codes. As such these mechanisms may be applied in a manner that is not perceptible under nominal conditions, e.g. applied in a way that does not degrade an original image. These N-ary schemes include binary encoding but with an added benefit of being able to maximize a color mismatch.

Figure 8:
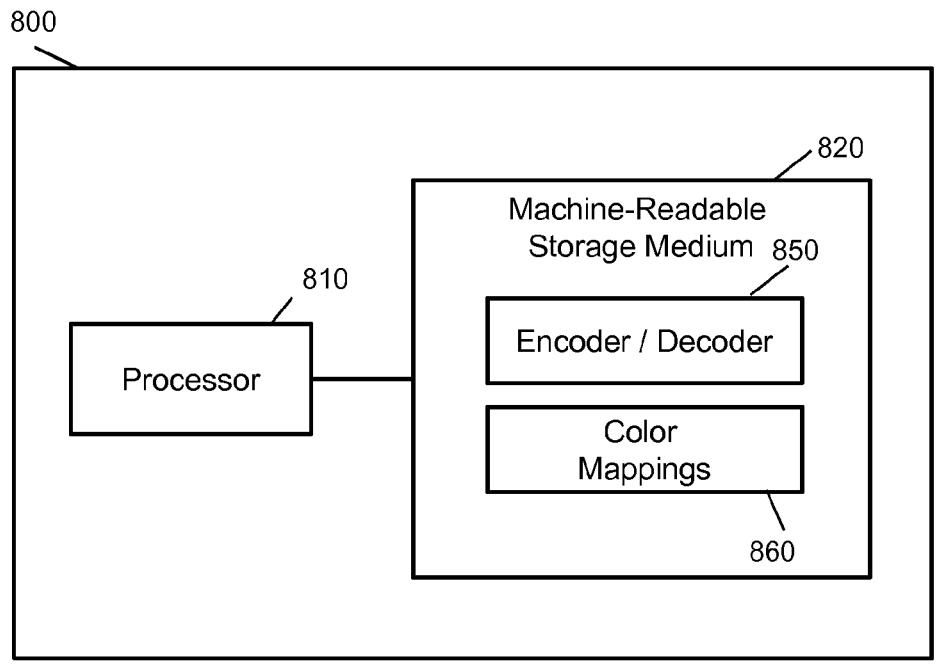
FIG. 8 is a schematic illustration of a processing device that may be used to implement at least an encoder according to an example.

Certain methods and systems as described herein may be implemented by a processor that processes computer program code that is retrieved from a non-transitory storage medium. FIG. 8 shows an example of an imaging system 800 comprising a machine-readable storage medium 820 coupled to a processor 810. In certain case the imaging system 800 may comprise a computer; in other cases the imaging device may comprise a printer, scanner, display device, portable computing device or the like. Machine-readable media 820 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises program code to implement one or more of an encoder 130, a decoder 230 or one or more of the methods of FIGS. 5 to 7. In certain cases, the machine-readable storage medium may also comprise a color mapping 860, which may be in the form of a look-up table.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of determining a set of color mappings for encoding data values in an image comprising:

determining, for at least one sampled color in a first color space associated with a first set of conditions, a set of metamers for the sampled color, each metamer having a different representation in a second color space, the second color space being used to output the image;

determining a range of color differences for the set of metamers under a second set of conditions; and determining a plurality of color mappings to the second color space for the at least one sampled color based on the range of color differences, wherein each color mapping in the plurality of color mappings is useable to encode a different data value in the image, and wherein the data values are detectable when the second set of conditions are applied to the image.

2. The method of claim 1, wherein a color is represented in the second color space by an ink-primary-overprint area-coverage vector.

3. The method of claim 1, wherein determining a plurality of color mappings comprises:

determining color mappings to at least two metamers, a first metamer and a second metamer having a color difference that is below a first threshold under the first set of conditions, and the first metamer and the second metamer having a color difference that is above a second threshold under the second set of conditions, each metamer being used to encode a respective data value.

4. The method of claim 3, wherein:

the first metamer and the second metamer are selected to have a minimum color difference under the first set of conditions; and the first metamer and the second metamer are selected to have a maximum color difference under the second set of conditions.

5. The method of claim 1, wherein each metamer in the second color space maps to a common color value in the first color space under the first set of conditions.

6. The method of claim 1, wherein determining a range of color differences comprises:

determining a quantization scheme for the range of color differences, the quantization scheme defining the number of color mappings in the plurality of color mapping and, as such, the number of data values that can be encoded in the image.

7. The method of claim 1, wherein determining a range of color differences for the set of metamers under a second illuminant comprises:

determining the range of differences for a range of grain values.

8. The method of claim 1, wherein each color mapping comprises a look-up table that maps a color value with a representation in an Commission Internationale de l'Éclairage (CIE) XYZ color space to a color value in an Neugebauer Primary Area Coverage color space.

9. A method of encoding data comprising:

receiving an image comprising pixels having color values in a first color space;

receiving data to be encoded in the image;

selecting one or more pixels to encode the data, wherein each pixel selected to encode the data is associated with a data value from the data;

for each pixel selected to encode the data:

selecting a metamer in a second color space based on the data value associated with the pixel, the metamer being selected from a plurality of metamers for a color value of the pixel under a first set of conditions, each data value having a different associated metamer in the second color space, each metamer having a different color metric under a second set of conditions; and outputting the image using the selected color representations, wherein the data is decodable from the image on application of the second set of conditions; and wherein the plurality of metamers comprise three or more color mappings and at least two of the plurality of metamers encode different non-zero data values.

10. The method of claim 9, comprising:

applying the second set of conditions to the image;

acquiring a representation of the image;

determining a color metric for one or more pixels of the representation;

mapping the color metric for the one or more pixels to one of the data values; and determining at least a portion of the data from the mapped data value.

11. The method of claim 9, wherein the plurality of metamers have a set of color metrics below a first threshold under the first set of conditions.

* * * * *